United States Patent [19]
Kimura et al.

[11] Patent Number: 4,754,460
[45] Date of Patent: Jun. 28, 1988

[54] DRIVE CIRCUIT FOR SEMICONDUCTOR LASER OF OPTO-ELECTRIC RECORDING/PLAYBACK APPARATUS

[75] Inventors: Mari Kimura; Tamotsu Matsuo, both of Osaka; Kenji Koishi, Hyogo, all of Japan

[73] Assignee: Matsushita Electric Industrial Co., Ltd., Osaka, Japan

[21] Appl. No.: 4,586

[22] Filed: Jan. 20, 1987

[30] Foreign Application Priority Data

Jan. 21, 1986 [JP] Japan .................................. 61-10816

[51] Int. Cl.$^4$ .............................................. H01S 3/00
[52] U.S. Cl. ......................................... 372/38; 372/29
[58] Field of Search .................................... 372/38, 29

[56] References Cited

U.S. PATENT DOCUMENTS 4,114,180 9/1978 Kayanuma ............................ 372/29
4,516,242 5/1985 Yokota ................................. 372/29

*Primary Examiner*—Léon Scott, Jr.
*Attorney, Agent, or Firm*—Lowe, Price, LeBlanc Becker & Shur

[57] ABSTRACT

A drive circuit for a semiconductor laser in an apparatus for recording/playback of data utilizing an optical recording medium includes circuit elements for establishing recording and playback operating conditions respectively in which output light levels from the laser are set to suitable values for recording and playback, and for controlling the laser output light levels during recording and playback operation at fixed values, and moreover for modulating the laser output light in accordance with a recording signal during recording operation. A changeover control signal which executes changeover between the recording and playback conditions is derived such as to begin in coincidence with the start of a leading pulse of a series of recording signal pulses, and to end immediately following the final recording signal pulse, to thereby avoid excessive laser drive current levels following changeover between playback and recording operating conditions.

3 Claims, 3 Drawing Sheets

DRIVE CIRCUIT FOR SEMICONDUCTOR LASER OF OPTO-ELECTRIC RECORDING/PLAYBACK APPARATUS

BACKGROUND OF THE INVENTION

The present invention relates to a drive circuit for a semiconductor laser utilized in an opto-electric data recording/playback apparatus for digital data on optical disc records.

A semiconductor laser is generally utilized as a source of a light beam which is employed for recording and playback of data by an opto-electric data recording/playback apparatus which employs optical disc records as a recording medium. During playback mode operation, the level of output light power from the laser is held constant at a relatively low value (e.g. approximately 1 mW. During recording mode operation, the output light power level from the laser is modulated to produce output light pulses with a power level which is several times that employed during playback operation. This modulation is performed in accordance with a recording signal, which may represent for example data which has been processed by a computer.

The level of output light power from a semiconductor laser usually displays substantial variations in response to operating temperature changes. It is therefore necessary to stabilize the output light power level, e.g. by means of a feedback control system whereby the output light power level from the laser is monitored by a photo-receptive element such as a PIN diode and a signal produced thereby is fed back to control the drive current supplied to the laser.

When such an opto-electric data recording/playback apparatus is utilized to record and playback data processed by a computer, a controller is generally utilized as an interface between the apparatus and the computer. The controller serves to convert data which has been processed by the computer into a recording signal which is used to modulate the laser output light power level. The controller may also generate a write gate signal which controls changeover of the apparatus between recording operation and playback operation. The write gate signal is usually generated by microprogram operation of a CPU within the controller, and transferred through an output port. Specifically, the microprogram operation functions such that when a recording signal is to be supplied from the controller to the opto-electric data recording/playback apparatus, firstly a write gate signal is initiated, the recording signal is then transferred from the controller to the recording/playback apparatus, and following termination of the recording signal the write gate signal is terminated. FIGS. 2A and 2B are timing diagrams to illustrate the above sequence of operations, and respectively show the write gate signal and the recording signal. Due to the fact that the write gate signal is generated by microprogram operation and then transferred through a CPU output port, a certain degree of program execution time is necessary, so that it is difficult to precisely synchronize the start of the recording signal with the start of the write gate signal. As a result there is a time delay of the order of 10 to 20 microseconds between the start of the write gate signal and the start of the recording signal. In addition, the trailing edge of the write gate signal is delayed with respect to the final trailing edge of the recording signal by a similar amount of delay time.

FIG. 1 is a circuit diagram of an example of a prior art drive circuit for a semiconductor laser of a recording/playback apparatus as described above, which is disclosed in U.S. patent application Ser. No. 758,807 of 25th July 1985. Reference numeral 1 denotes a semiconductor laser, and numeral 2 a PIN diode for monitoring a level of light output from the laser 1. Numeral 3 denotes a current-voltage converter circuit for converting a current which flows through PIN diode 2 and represents a level of light produced by laser 1, into an error voltage which is utilized in a control loop for feedback control of the input power supplied to laser 1, i.e. control of the the laser current. Numeral 4 denotes an operational amplifier forming part of the aforementioned control loop, having a noninverting input to which the error voltage is applied. 5a and 5b denote transistors connected in a common-emitter configuration with semiconductor laser 1 connected to receive the collector current of transistor 5b, whereby modulation of the laser current is accomplished by applying a recording signal B between the base terminals of transistors 5a and 5b. Numerals 8 and 9 denote variable resistors which are utilized to set the values of respective control voltages for determining levels of current flow through semiconductor laser 1, and hence levels of light which are emitted by laser 1 during data recording operation and data playback operation respectively. One of these control voltages is selected by a pair of analog gate switches 7a, 7b to be applied to the inverting input of operational amplifier 4, under the control of a write gate signal A. This write gate signal A and the recording signal B are supplied from a controller 11 coupled to a computer 10, which processes the data to be recorded.

The output voltage from operational amplifier 4 is applied to the base of a transistor 6, whose collector is coupled to the common emitters of transistors 5a and 5b, whereby the level of current flow through these transistors, and hence the level of light produced by laser 1, is determined by the operational amplifier output voltage and a resistor 6b connected to the emitter of transistor 6, with transistor 6 and resistor 6b functioning as a current source.

During playback operation, switch 7b is closed and 7a is opened, whereby a control voltage of value determined by variable resistor 9 is applied to operational amplifier 4, while during recording operation switch 7a is closed and 7b is opened so that a control voltage of value determined by variable resistor 8 is applied.

The write gate signal A is initiated (i.e. in this example, goes from a low logic level to a high logic level) at a point in time prior to transfer of the recording signal B from controller 11, as described above and shown in FIG. 2. When the write gate signal is thus initiated, the analog switch 7a is closed and switch 7b is opened, so that the control voltage applied to operational amplifier 4 is switched from the value required during playback to that required during recording. However due to the fact that the recording signal is delayed with respect to the write gate signal, by approximately 10 to 20 microseconds, no light will be emitted during that delay interval. This is illustrated in FIG. 2C, which shows an idealized waveform diagram of the output light from semiconductor laser 1 in response to recording signal B and light gate signal A, with the initial delay between the recording signal and write gate signal being indicated as b. That is to say, during this interval b, in spite of the fact that the write gate signal has switched the control voltage of operational amplifier 4 to that required during recording operation, the recording signal has not yet been supplied to transistors 5a, 5b, so that no light will be emitted by laser 1. No output current will therefore be produced from PIN diode 2 during interval b, so that no error voltage will be applied to operational amplifier 4 from current-voltage converter circuit 3. As a result, the feedback control loop will enter a condition for generation of a maximum level of output light from laser 1. At the end of the delay interval b, the leading pulse c of the recording signal is applied to the base of transistor 5a, whereby modulation of the level of light produced by semiconductor laser 1 is initiated. However since the feedback control loop is in a condition whereby a maximum level of light is emitted by semiconductor laser 1, during a period of time following the start of modulation operation, the leading pulse of the recording signal and several pulses following thereafter will result in excessively high levels of modulated output light being produced. The modulated light output is shown in FIG. 2D, with the initial excessively high levels being indicated by e. These excessive output levels will eventually be reduced to a predetermined recording level, after a time which is determined by the frequency response of the feedback control loop. However due to the fact that excessive light levels are produced by the semiconductor laser in response to the first few pulses of the recording signal, after switching from playback to recording operation is executed, the leading portion of the data which is thus recorded will not be reliable.

Similarly, the error signal produced from PIN diode 2 during the delay time interval d shown in FIG. 2C will result in an excessive surge of output light level from semiconductor laser 1, as indicated by f in FIG. 2D.

These excessive levels of output light from semiconductor laser 1 result from excessive levels of current flow through the laser, which exceed the maximum rated drive current value, and therefore result in a significant reduction of the operating lifetime of semiconductor laser 1.

SUMMARY OF THE INVENTION

It is an objective of the present invention to overcome the problems of the prior art described above by providing a drive circuit for a semiconductor laser of an opto-electric data recording/playback apparatus whereby leading pulses of a recording signal are accurately recorded by correct modulation of output light from the semiconductor laser, and whereby excessive levels of current flow through the laser are prevented, to thereby provide higher reliability of recording operation and increased semiconductor laser operating lifetime.

To attain the above objectives, a drive circuit for a semiconductor laser according to the present invention incorporates means for generating a mode control signal which initiates changeover from a playback mode of the semiconductor laser to a recording mode, i.e. changeover from a condition in which a fixed level of current suitable for data playback is passed through the semiconductor laser to a condition in which each pulse of the recording signal will result in a pulse of current through the semiconductor laser at a level suitable for recording operation. The mode control signal also initiates changeover from the recording mode operation condition back to the playback mode operation condition. The mode control signal is derived such as to be initiated (and hence initiate changeover from the playback mode to the recording mode condition) at a timing which coincides with the leading edge of the initial pulse of the recording signal, and is terminated (and hence initiates changeover from the recording to the playback condition) at a timing which is determined by and is subsequent to the final pulse of the recording signal.

More specifically, an optical recording and playback apparatus having a drive circuit and a semiconductor laser driven by the drive circuit, the apparatus being operable selectively in a recording mode to record data in the form of a series of pulses from an external data source to an optical disc medium and in a playback mode to playback data from an optical disc medium. The apparatus comprises means for modulating a light output level of the laser, in the recording mode, in response to the series of the pulses and means for establishing a predetermined period of time. Means are further included for generating a mode control signal during recording of data in the recording mode, the control signal initiated in coincidence with a leading edge of the initial pulse of the series of pulses and terminated a predetermined period of time after a trailing edge of each subsequent pulse of the series of pulses to determine the final pulse of the series of pulses. The apparatus further includes means responsive to the mode control signal for controlling a light power level output of the laser to establish selectively the recording and playback modes; and means for controlling the semiconductor laser to maintain predetermined levels of light output from the laser during the recording and playback modes, respectively.

DESCRIPTION OF THE PREFERRED EMBODIMENTS

Figure 1:
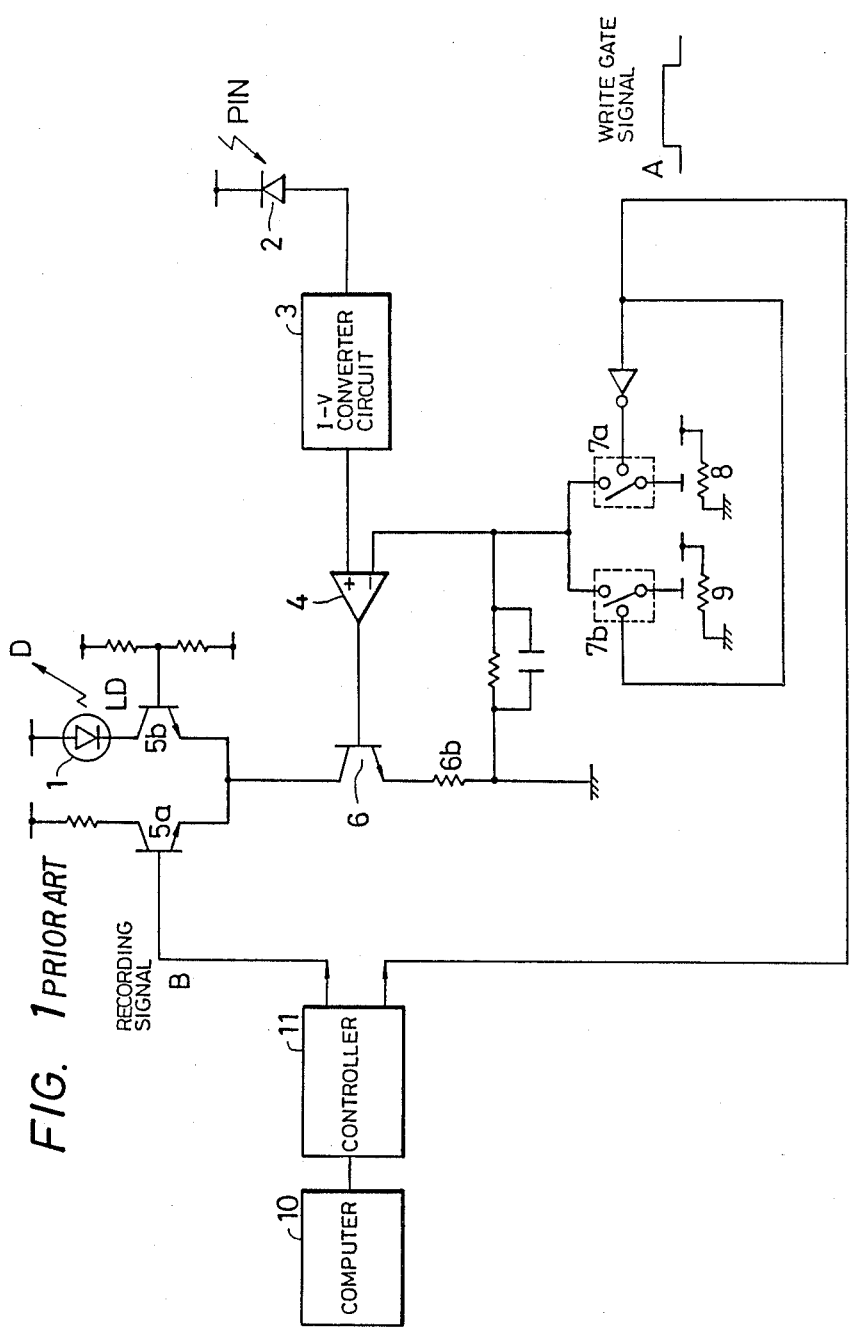
FIG. 1 is a circuit diagram of an example of a prior art drive circuit for a semiconductor laser of an opto-electric data recording/playback apparatus.
Figure 3:
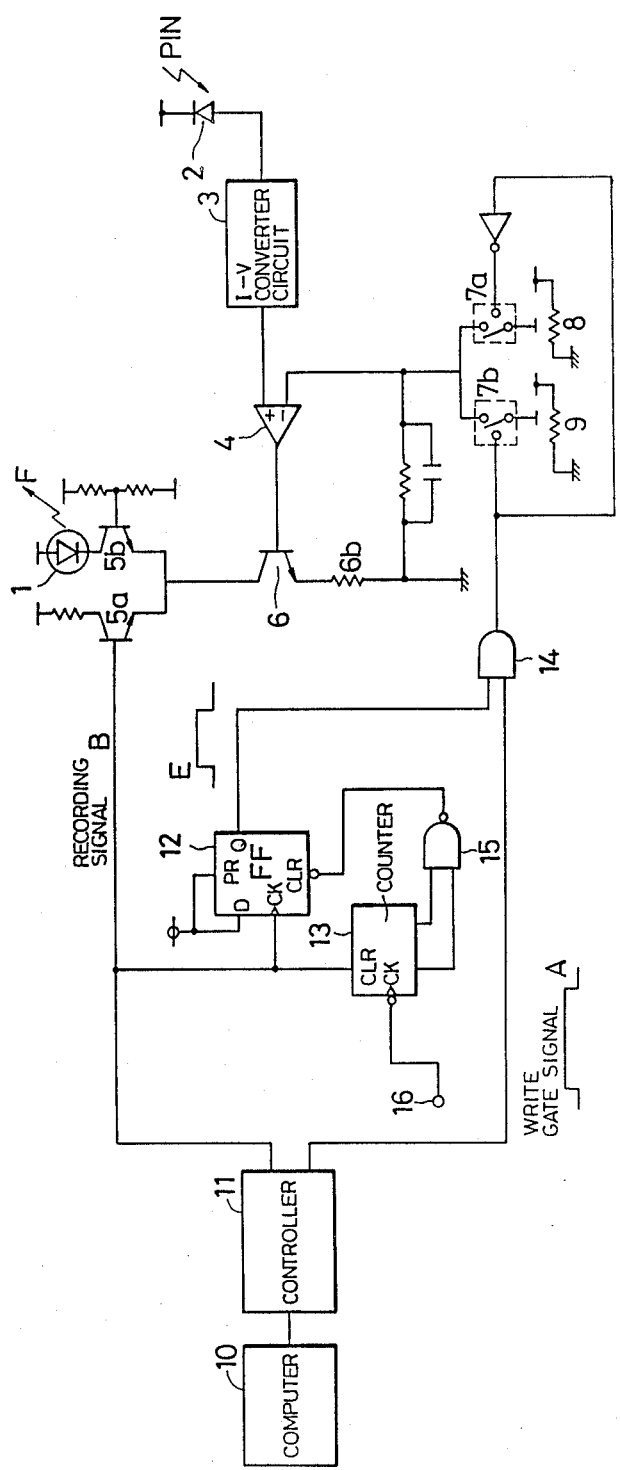
FIG. 3 is a circuit diagram of an embodiment of a drive circuit for a semiconductor laser of an opto-electric data recording/playback apparatus according to the present invention.

FIG. 3 is a circuit diagram of an embodiment of a semiconductor laser drive circuit according to the present invention. In FIG. 3, components and circuit blocks having identical functions to those in the prior art example of FIG. 1 are indicated by corresponding reference numerals, and further description will be omitted.

The recording signal B which is transferred through controller 11 from computer 10 consists of a series of pulses, with the intervals between successive pulses each being an integral multiple of a minimum period 1T, i.e. the intervals can be expressed as 1T, 2T, ... NT. In the following, the maximum interval between successive pulses of the recording signal will be designated as nT. Numeral 12 denotes a D-type flip-flop (abbreviated hereinafter to FF) having a clock input terminal to which is applied the recording signal B, and data and preset terminals which are fixedly connected to a high logic level potential. FF 12 produces an output signal from a Q output terminal which will be referred to as the changeover control signal E, having a leading edge which coincides with the leading edge of the series of pulses comprising the first pulse of recording signal B and a trailing edge which is produced at a timing subsequent to and determined by the timing of the final pulse of recording signal B.

Figure 2:
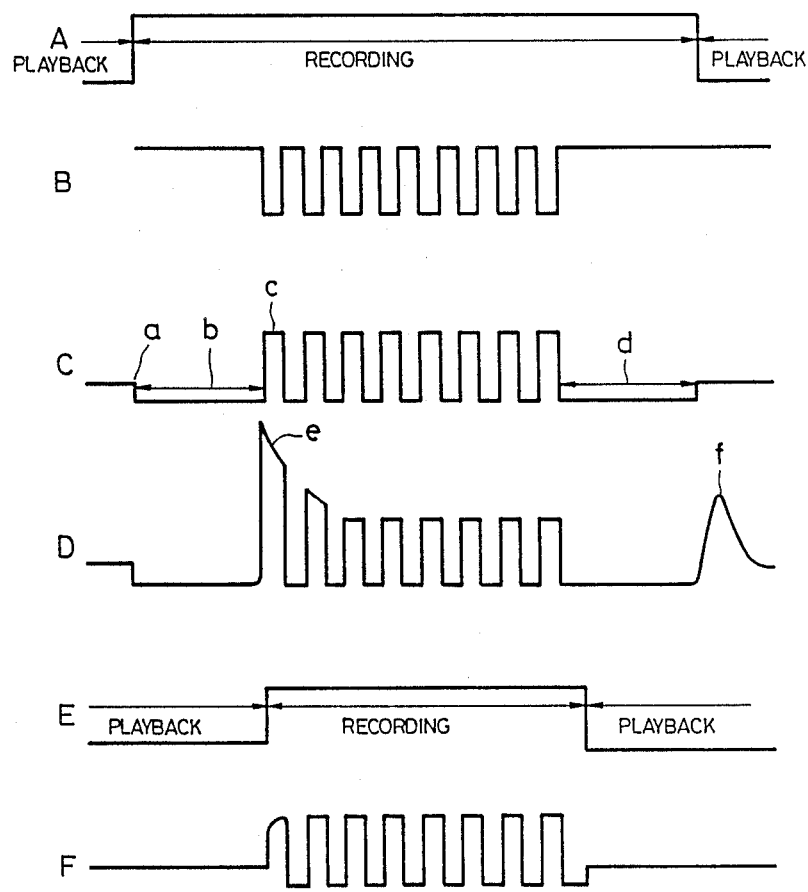
FIGS. 2A to 2F are waveform diagrams for assistance in describing the operation of the circuit of FIG. 1 and of an embodiment of the present invention.

Numeral 13 denotes a counter having a "clear" input terminal to which recording signal B is applied, and a clock input to which a clock signal is applied from an external source through a terminal 16. This clock signal consists of a train of pulses having a period which is ½ of the pulse width of the pulses in recording signal B. The count output signals from counter 13 are applied to a NAND gate 15, whose output is applied to a "clear" terminal of FF 12. The counter 13 has a maximum count value corresponding to the maximum period nT between successive pulses of recording signal B. Thus, so long as the recording signal B is being applied to the "clear" input of counter 13, the counter cannot attain this maximum count value, so that the output from NAND gate 15 applied to the "clear" input of FF 12 is held at the high logic level. The Q output of FF 12, i.e. the changeover control signal E therefore goes from the low to the high logic level at a timing coincident with the leading edge of the first pulse of the recording signal B, and is thereafter held at the high level. Following the trailing edge of the final pulse of the recording signal B, after a time interval exceeding nT has elapsed, the output from NAND gate 15 will go to the low logic level, whereby a "clear" input signal is applied to FF 12 causing the changeover control signal to change from the high to the low level. This condition will be maintained until the next occasion when a group of pulses of the recording signal B is transferred from controller 11. The waveform of changeover control signal E and the timing relationship with the recording signal B are shown in FIG. 2E. As described above, the changeover control signal E is initiated at a timing coinciding with the leading edge of the first pulse of recording signal B, and is terminated at a timing determined by and subsequent to the trailing edge of the final pulse of recording signal B, i.e. is terminated in this embodiment following a time delay of nT after the trailing edge of the final pulse of recording signal B.

Assuming for example that n=4 and that T=400 nanoseconds, then nT will be equal to 1.6 microseconds. This delay time is substantially shorter than the delay time d shown in FIG. 2C for the case of the prior art example described above.

In the present embodiment, the mode control signal E is transferred through an AND gate 14 under the control of the write gate signal A from controller 11, i.e. with AND gate 14 being enabled while the write gate signal A is at the high logic level.

The PIN diode 2 is preferably mounted within the same case as the semiconductor laser 1.

The function of the mode control signal E transferred from AND gate 14 is identical to that of the write gate signal A in the prior art embodiment described above, i.e. when the write gate signal A is initiated, analog switch 7a is closed and switch 7b is opened, so that the recording mode is established. Specifically, the control voltage applied to the inverting input of operational amplifier 4 is switched from the value required during playback (determined by the setting of variable resistor 9) to that required during recording (determined by the setting of variable resistor 8). When recording signal E is terminated, switch 7a is opened and switch 7b is closed, whereby the playback mode is established, i.e. the control voltage applied to operational amplifier 4 is switched from the value required during recording to that required during playback. During the recording mode, a flow of current is established through transistor 6, having a level which is determined by the output voltage from operational amplifier 4, and which is switched to flow through either transistor 5a or transistor 5b in accordance with the logic level of the recording signal B. The current flow through semiconductor laser 1 is thereby modulated by recording signal B. The waveform of the resultant output light level from laser 1 is shown in FIG. 2F. Due to the fact that the leading edge of the changeover control signal E coincides with the leading edge of initial pulse c of recording signal B, an immediate changeover is executed from the playback mode to the recording mode, with time delay b of the prior art example described above being eliminated. As a result, excessive current flow through semiconductor laser 1 at the start of recording signal B is prevented.

In addition, following the time interval nT after the final pulse of recording signal B, the changeover control signal E executes changeover from the recording to the playback mode, i.e. with an amount of delay which can be made much shorter than the delay between the final pulse of recording signal B and the trailing edge of the write gate signal A. In this way, excessive flow of current through semiconductor laser 1 after changeover from recording to playback operation is avoided, and the correct level of current flow through laser 1 for playback operation is rapidly established in a stable manner.

In the present embodiment, the mode control signal E is only transferred through AND gate 14 when this gate is enabled by the write gate signal A, i.e. while write gate signal A is at the high level. This serves to prevent recording errors being produced, even in the event that the light gate signal or the recording signal is transferred from controller 11 at an incorrect timing.

Since a drive circuit according to the present invention effectively prevents excessive flow of current through a semiconductor laser of an opto-electric data recording/playback apparatus, it can be understood that such a drive circuit provides a significant improvement in the operating lifetime of such a semiconductor laser, together with increased reliability of modulation of the output light from the laser, and therefore can provide substantially increased overall reliability of such an apparatus.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. An optical recording and playback apparatus having a drive circuit and a semiconductor laser driven by said drive circuit, said optical recording and playback apparatus operating selectively in a recording mode to record data in the form of a series of pulses from an external data source to an optical disc medium and in a playback mode to playback data from an optical disc medium, said drive circuit comprising:
   means for modulating a light output level of said laser, in said recording mode, in response to said series of pulses;

means for establishing a predetermined period of time;

means for generating a mode control signal during recording of data in said recording mode, said control signal initiated in coincidence with a leading edge of the initial pulse of said series of pulses and terminated a predetermined period of time after a trailing edge of each subsequent pulse of said series of pulses to determine the final pulse of said series of pulses;

means responsive to said mode control signal for controlling a light power level output of said laser to establish selectively said recording and playback modes; and means for controlling said semiconductor laser to maintain predetermined levels of light output from said laser during said recording and playback modes, respectively.

2. A drive circuit according to claim 1, in which said external source further produces a write gate signal which is initiated at a timing preceding said initial pulse of the series of pulses and is terminated at a timing succeeding said final pulse of the series of pulses, and further comprising means for gating said mode control signal to said light power level output control means in response to said write gate signal.

3. A drive circuit according to claim 1, in which said means for establishing a predetermined period of time comprises a source of clock pulses having a period which is shorter than a pulse width of said series of pulses and in which said means for generating a mode control signal further comprises counter circuit means for counting said clock pulses and producing an output signal when a count value is attained which is predetermined to exceed a maximum interval between successive pulses of said series of pulses, and bistable circuit means for producing said mode control signal, and responsive to said output signal from said counter means for terminating said mode control signal.

* * * * *